(12) United States Patent
Fromherz

(10) Patent No.: US 7,230,736 B2
(45) Date of Patent: Jun. 12, 2007

(54) PLANNING AND SCHEDULING RECONFIGURABLE SYSTEMS WITH ALTERNATIVE CAPABILITIES

(75) Inventor: Markus P. J. Fromherz, Palo Alto, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 846 days.

(21) Appl. No.: 10/284,561

(22) Filed: Oct. 30, 2002

(65) Prior Publication Data

US 2004/0085562 A1    May 6, 2004

(51) Int. Cl.
G06F 15/00 (2006.01)
G06F 19/00 (2006.01)
G01V 3/00 (2006.01)

(52) U.S. Cl. ............... 358/1.16; 358/1.13; 700/96; 700/100; 700/103; 340/853.2

(58) Field of Classification Search ........... 358/1.13, 358/1.15; 703/22, 16, 19, 27; 340/853.2; 700/100, 103, 96, 6
See application file for complete search history.

(56) References Cited

U.S. PATENT DOCUMENTS 5,093,794 A * 3/1992 Howie et al. ............... 700/100
5,095,342 A    3/1992 Farrell et al. .............. 355/319
5,159,395 A   10/1992 Farrell et al. .............. 355/319
5,557,367 A    9/1996 Yang et al. ................. 355/202
5,631,740 A    5/1997 Webster et al. ............ 358/296
5,696,893 A   12/1997 Fromherz et al. .......... 395/112
6,546,364 B1 *  4/2003 Smirnov et al. ............. 703/22

FOREIGN PATENT DOCUMENTS

WO    WO 02/21373    3/2002

OTHER PUBLICATIONS

G.J. Garwood and A.C. Robinson, "Work Management System", British Telecommunication Engineering, London, GB, vol. 10, Oct. 1991, pp. 204-210.
Robert P. Goldman and Mark S. Boddy, "A Constraint-Based Scheduler for Batch Manufacturing", IEEE Expert, IEEE Inc. New York, vol. 12, No. 1, Jan.-Feb. 1997, pp. 49-56.

* cited by examiner

Primary Examiner—King Y. Poon
Assistant Examiner—Thomas J. Lett
(74) Attorney, Agent, or Firm—Linda M. Robb

(57) ABSTRACT

A system is provided to allow automated planning and scheduling of the work flow for reconfigurable production systems having a plurality of modules, with each module having alternative capabilities. The system includes a system controller, at least one planning function, and at least one scheduling function.

35 Claims, 3 Drawing Sheets

PLANNING AND SCHEDULING RECONFIGURABLE SYSTEMS WITH ALTERNATIVE CAPABILITIES

CROSS REFERENCE TO RELATED APPLICATIONS

The following copending applications, U.S. application Ser. No. 10/284,514, titled "Planning and Scheduling Reconfigurable Systems around Off-line Resources", and U.S. application Ser. No. 10/284,560, titled "Planning and Scheduling Reconfigurable Systems with Regular and Diagnostic Jobs", all filed of even date, are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,631,740 to Webster et al. ("Transducers with Constraints Model for Print Scheduling"); and U.S. Pat. No. 5,696,893 to Fromherz et al. ("System for Generically Describing and Scheduling Operation of Modular Printing Machine").

BACKGROUND OF THE INVENTION

This invention relates generally to a system and method for planning and scheduling work flow and processes for reconfigurable production operations and equipment, which, depending upon the job, may be variably applied to work pieces that may be highly variable between different jobs.

Reconfigurable production systems increasingly consist of multiple parallel, alternative modules that are connected through flexible paths and even loops. Consequently, such systems are expected to offer a multitude of alternative operations (or capabilities) to produce the same outputs. For example, a modular printing system may consist of several identical, parallel printers connected through flexible paper paths that feed to and collect from these printers. The system control software available for such systems today has as its heart a sophisticated scheduling component, but is not set up to make good use of such a reconfigurable, parallel production system. This is primarily due to the lack of a generic, powerful planning component which would select the optimal sequence of operations among the plurality of available operations.

A reconfigurable production system may be modeled as a graph of connected modules, with each module described by a model of its structure and its capabilities. The structure is primarily the interface through with work units enter and exit, such as entry and exit ports, plus any internally used resources. A capability is an operation that accepts work units at entry ports, processes them, and moves them to exit ports. (Entry and exit ports here refer to mechanical interfaces, such as slots or trays, as well as computer interfaces. A port may serve as both entry and exit port.) Operation of such a system has been modeled as a sequence of capability executions as work units move along valid paths in the graph from module to module.

An example for a reconfigurable production system is a modular printer, with modules such as feeders, mark engines, paper transports, inverters, etc. There, the work units are sheets and images. A simple paper transport module has an entry port, an exit port, and a single capability, to move a sheet of paper from its entry port to its exit port. An inverter module has one entry port, one exit port, and two capabilities, one to invert a sheet of paper and one to bypass the inversion mechanism. A mark engine transfer module has two entry ports (one for sheets and one for images), one exit port (for marked sheets), and one capability, to print the image onto the sheet. A sample resource in all of these modules is the space occupied by the sheet, which may only be occupied by one sheet at a time. Other examples of reconfigurable production systems are assembly lines, for example for the assembly or packing of computer parts, and automated analytic systems, such as blood sample analysis machines. In these different production systems, work units may be sheets of paper, electronic files, computer parts, semiconductor wafers, blood sample trays, any parts or composites of these, or other physical or electronic objects being processed by production systems. Transport mechanisms may be conveyor belts or robotic arms or any other devices or functions for moving work units.

Module capabilities may be composed to system capabilities by incrementally unifying work unit and time variables of output and input events at connected modules along valid paths in the system graph. For example, if a module's exit port is connected to another module's entry port, any capability producing work units for the first module's exit port potentially can be composed with any capability consuming work units from the second module's entry port. Unification of work unit and time variables ensures the consistency of attribute and time constraints.

A scheduler for such systems receives a stream of jobs, each consisting of a sequence of desired work units to be produced at some final exit port of the system. Each desired work unit is described by a work unit variable with attribute constraints. This is used to select a suitable system capability that can produce the desired work unit by unifying the desired work unit variable with the work unit variables of system capabilities producing work units for the desired exit port. As system capabilities for the desired work units in the jobs are found, their time and resource constraints are posted to the constraint store, and the constraints are solved in order to find time values for the various module capabilities producing the desired work units. The selected module capabilities plus the time values are then sent to the modules so that they can execute the corresponding operations at the designated times.

This approach to system control does not have a real planning component. Instead, the controller selects the first system capability it can find and schedules that capability. Also, the selection requires that the output, such as the finisher where the job should be delivered, be specified. These restrictions are acceptable in some production systems, such as a typical in-line printing system that has either few alternative system capabilities for the same kind of job, or where alternative system capabilities mainly differ in the feeders and finishers being used.

This approach proves unsatisfactory for systems with many alternative, parallel system capabilities. For example, printing systems with multiple identical or similar mark engine modules require a more intelligent selection of the capabilities to achieve optimal productivity and load balancing. This selection can in principle be done before the scheduling step based on rules (for example, a rule for alternating between all mark engines to attempt optimal load balancing). It is preferable, however, to integrate planning with scheduling, in which the selection of individual capabilities would depend on the selection and timing of other capabilities being planned and scheduled at the same time.

SUMMARY OF THE INVENTION

Briefly stated, and in accordance with one aspect of the present invention, there is provided a system to allow automated planning and scheduling of the work flow for reconfigurable production systems having a plurality of modules, with each module having alternative capabilities. The system includes a system controller, at least one planning function, and at least one scheduling function.

In accordance with another aspect of the present invention, there is provided a method for the automated planning and scheduling of the work flow for reconfigurable production systems having a plurality of modules. The modules of the reconfigurable production system have various capabilities. The method includes planning the work flow for the reconfigurable production system and also scheduling the work flow for the various modules.

In accordance with yet another aspect of the present invention, there is provided an article of manufacture in the form of a computer usable medium in which is embedded computer readable program code. When the program code is executed by a computer, method steps for planning and scheduling the work flow for computer controlled reconfigurable production systems are performed. These method steps take the form of planning the work flow for the production system and scheduling the work flow for a plurality of modules in the production system.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system for integrating planning and scheduling functions within a system controller, in which the selection of individual capabilities would depend on the selection and timing of other capabilities being planned and scheduled at the same time. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
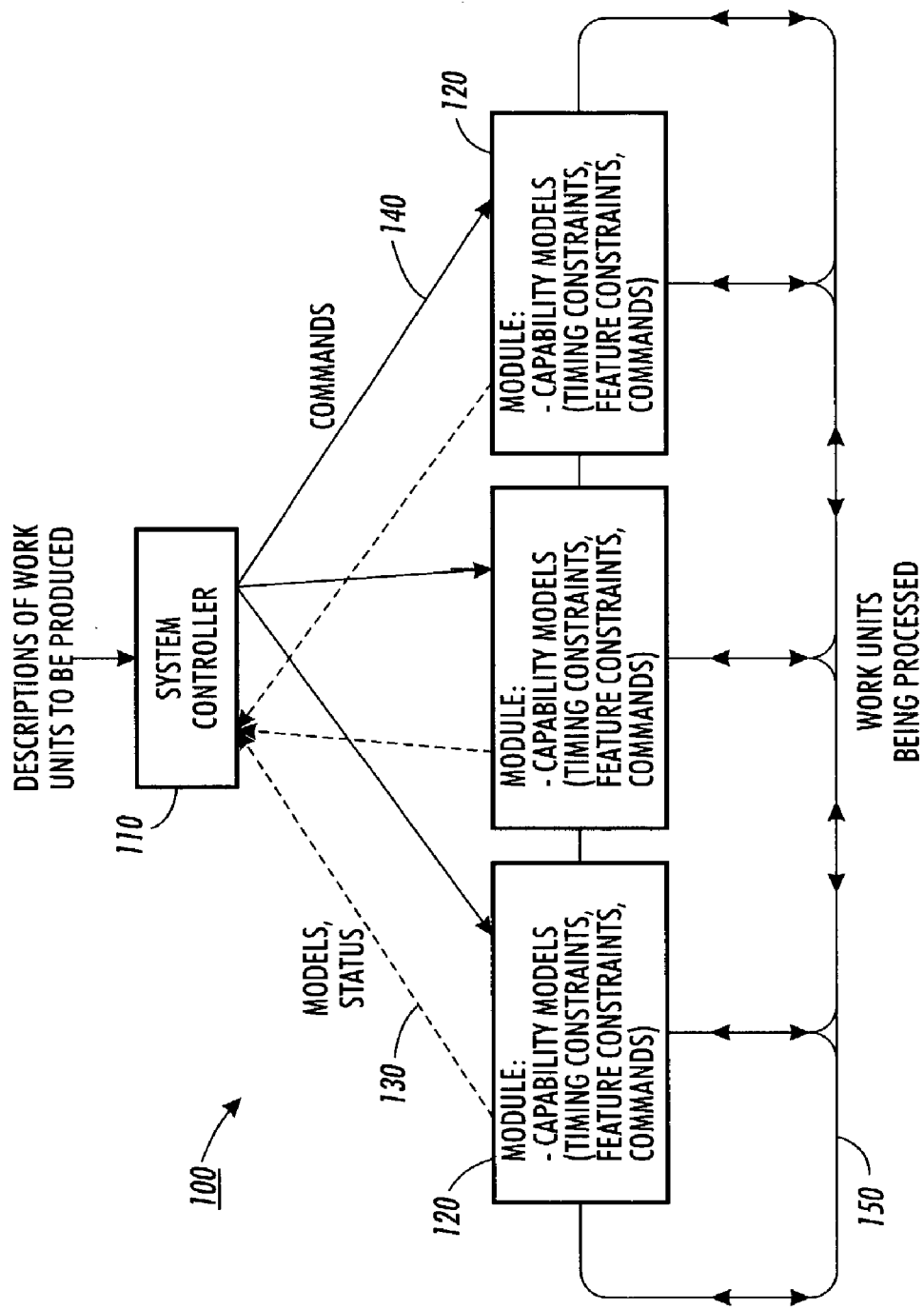
FIG. 1 illustrates a controller in accordance with one embodiment of the subject invention.

Turning now to the drawings, wherein the purpose is for illustrating the embodiments of the system and method, and not for limiting the same, FIG. 1 illustrates a controller for integrating planning and scheduling functions in conformance with one embodiment of the subject system. In a system 100, system controller 110 receives descriptions of work units to be produced from any known type of job input source. These descriptions correspond to descriptions of the desired output products. They may specify attributes (or properties) of the products, values or ranges or general constraints for these attributes, and possibly constraints on the timing of the production (e.g., deadlines), but generally without specifying how the products are to be produced.

System controller 110 also receives, along paths 130, capability models from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. Additionally there is also capability for operator feedback as to the work being scheduled on the modules and the state of the system at any point in time.

Figure 2:
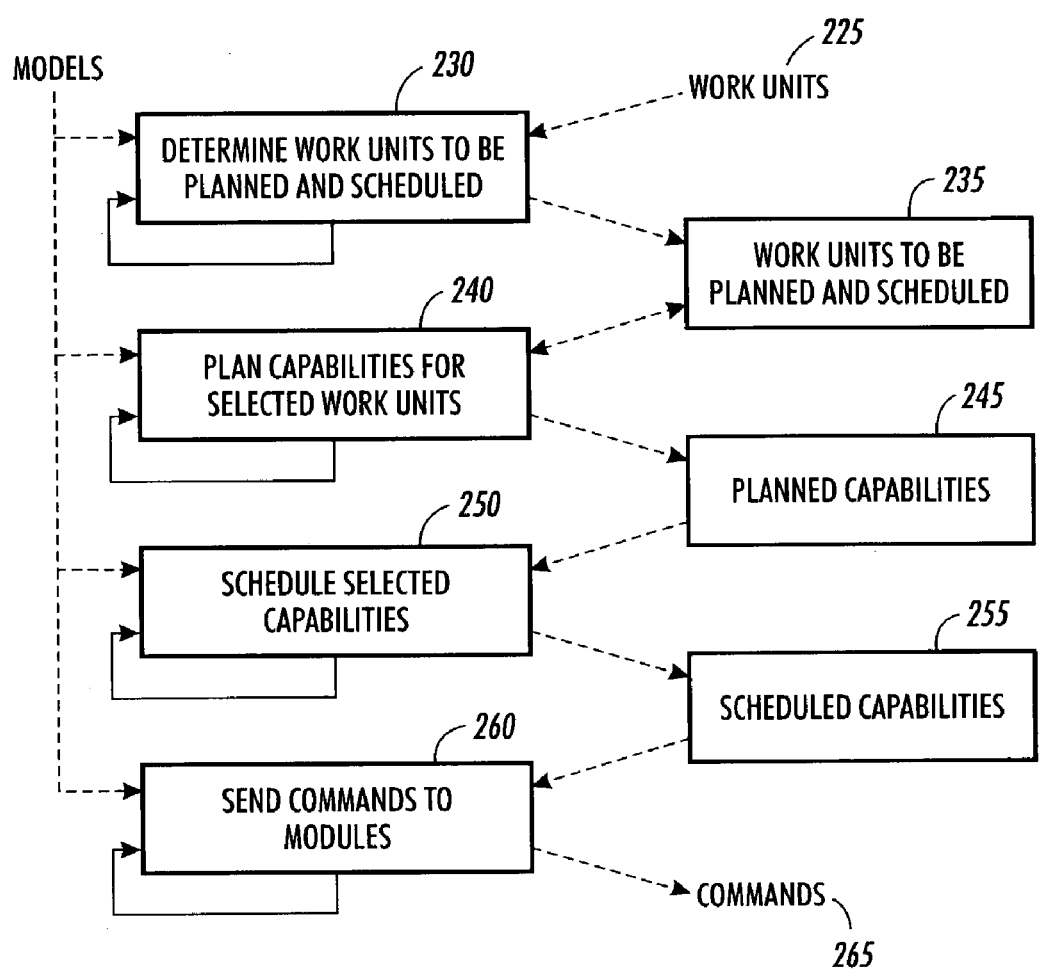
FIG. 2 provides a flow chart detailing the ordering of operations to accomplish system planning and scheduling in accordance with one embodiment of the subject invention.

FIG. 2 illustrates the planning and scheduling method of operation for the system controller. In this diagram, method steps are described in terms of data received and provided to each subsequent step in the process. Each of the steps 230, 240, 250, and 260 in this process may be executed in sequence (one after the other) or concurrently. In either case, each step consumes data 225, 235, 245, or 255 provided by a previous step and produces data 235, 245, 255, or 265 for the subsequent step. Consuming and producing this data is generally done incrementally, where a step is processing one data item after another, but may also be done in batches, as will be obvious to one skilled in the art of real-time software. Initially, a description of the work units 225, or job to be performed, is provided to the controller. The controller also has the models of the system modules available together with the current state of the system, e.g., which operations are currently performed by the modules, and any capabilities it may have previously planned and scheduled. The controller determines the work units to be planned and scheduled at step 230, based on the capability models provided by each module to be controlled and directed. This is an iterative step in which the controller incrementally reviews the jobs and their work units to select those work units to be planned and scheduled for the job next.

The selected work units 235 are then transmitted to step 240, which plans the capabilities for the selected work units, taking into consideration the capability model for each module. This step is repeated for each work unit selected in the previous step, resulting in a set of planned capabilities 245. With planned capabilities 245 and the module capability models, the controller at step 250 schedules the selected capabilities and provides a set of scheduled capabilities 255. These are in turn provided to step 260, at which the controller sends the commands 265 corresponding to the scheduled capabilities to the individual modules. This step is repeated for each scheduled capability. As can be seen in FIG. 2, each of steps 230, 240, 250 and 260 has all model information available for selective usage during each step. For example step 240 may access feature constraints, step 250 may utilize timing constraints, and step 260 may utilize commands.

Figure 3:
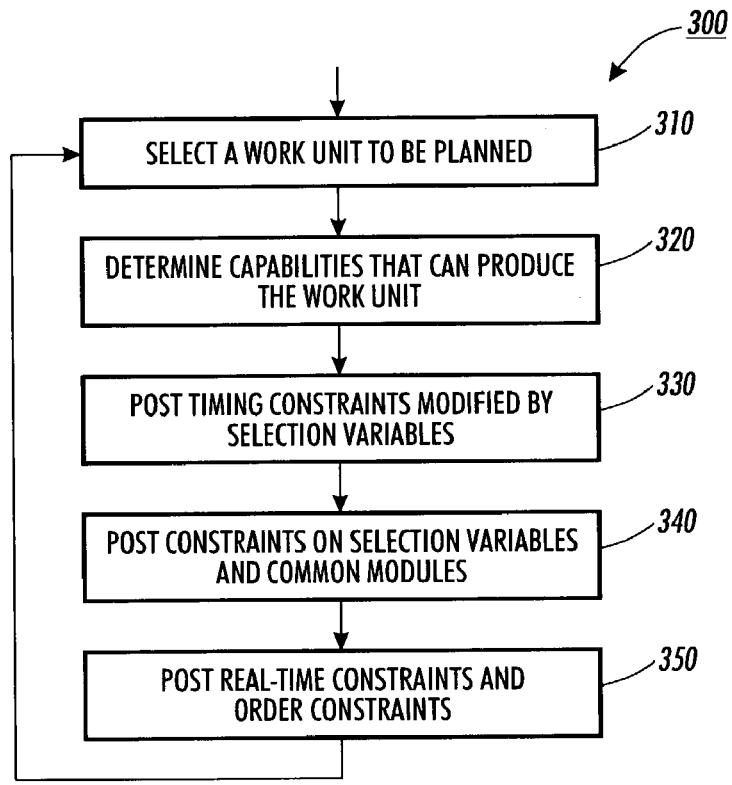
FIG. 3 provides a flow chart detailing the operation of the system planning component in accordance with one embodiment of the subject invention.

In FIG. 3, a flow chart illustrates the planning function 300 of the controller. A work unit or job to be planned is selected at step 310 based on the input job description. The controller then determines the capabilities needed to produce the work unit at step 320. In making this determination, the controller considers all possible system capabilities, from which alternative capabilities are selected. Timing constraints, such as the amount of time required for each task within a job (e.g., the duration of a transport operation or a processing step), constraints on the intervals during which resources are occupied, and the reservation of resources during such intervals are modified by selection variables and posted to the controller at step 330. Selection variables are Boolean variables, one for each capability, that become either TRUE (the capability is selected) or FALSE (the capability is not selected). Selection variables are created automatically for each capability by the planning step.

Constraints on the selection variables determine that, for example, only one of several alternative capabilities for the same output can be selected (i.e., only its selection variables can be TRUE). The modification of constraints is constraint-type-dependent. Allocation intervals in resource allocations, for example, are multiplied by the selection variables. The effect of these constraint modifications is that some constraints, such as a resource allocation, become only effective if the corresponding capability is being selected. The controller then posts to memory constraints on selection variables and common modules to the constraint store at step 340. At step 350 real-time constraints and order constraints are posted to the controller.

Since the correct output time must be used in the precedence constraints between capabilities of succeeding work units, the output variables of all alternative capabilities are connected to a single time variable, which is then used in the precedence constraints. The job constraints reserve resources for a job and all possible exit ports of capabilities being considered for work units in the job. If only part of a job is being scheduled at this point, the selected resource is reserved for the open-ended future, and otherwise for the duration of the job. The sequence of steps presented is only one example embodiment for the method disclosed herein. It will be apparent to one skilled in the art that numerous alternate step sequences would produce a similar result.

Figure 4:
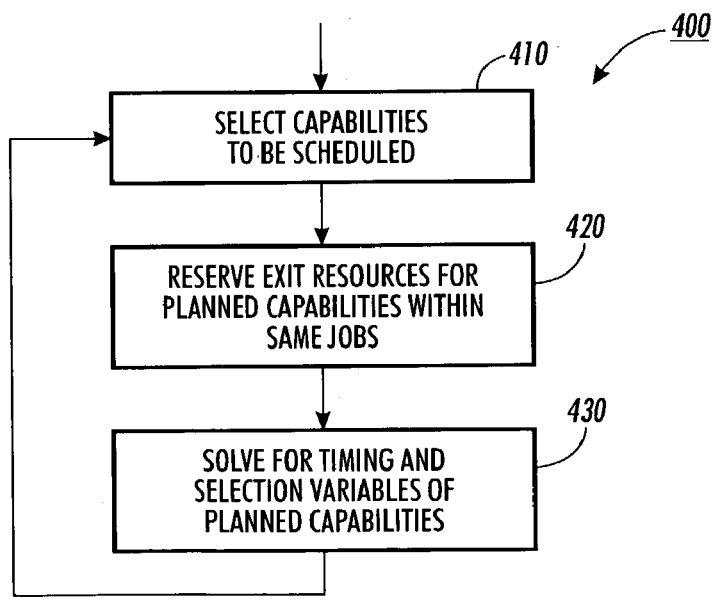
FIG. 4 provides a flow chart detailing the operation of the system scheduling component in accordance with one embodiment of the subject invention.

Turning now to FIG. 4, a flow chart illustrates the scheduling function 400 of the controller. Initially, the controller selects those capabilities to be scheduled, which may be all or a subset of the capabilities provided by the planning step. The controller then reserves exit resources for planned capabilities within the same jobs at step 420. Since all work units of the same job are constrained to be delivered to the same final exit port, the resource connected to that same final exit port, corresponding for example to a finisher stack in a print engine, cannot be used by other jobs until the job is finished. At step 430 the controller then solves for timing and selection variables of planned capabilities. This can be accomplished using a number of constraint solving or constrained optimization techniques, which are known to those skilled in the art. Finally, commands are sent to the modules based on selected capabilities in the schedule and the determined time variables in the constraint store.

One possible embodiment of a command set to illustrate the method disclosed herein is as follows:

initialize schedule S and constraint store C;
    repeat forever do
    determine sequence U of desired work units u at allowed exit ports $P_u$ to be considered for scheduling next;
    for all work units u in U do
        determine set $S_u$ of capabilities s such that u=output work unit of s and exit port of s is in $P_u$;
        add $S_u$ to S;
        post to C: timing constraints of $s_i$ in $S_u$, with selection variables $b_i$ added;
        for all $s_i$ in $S_u$, post to C: exit port of $s_i$=exit port of job of u; end for
        post to C: 1=sum ($s_i$ in $S_u$) $b_i$;
        post to C: $t_o$=sum ($s_i$ in $S_u$) $b_i$ times output time of $s_i$;
        post to C: real-time constraints for $s_i$ in $S_u$;
        post to C: order constraint for $t_o$;
    end for
    for all jobs j and all possibly capabilities $S_{i,j}$ scheduled above do
        $r_{i,j}$=resource for exit port of $s_{i,j}$;
        if all work units in j are being scheduled then
            post to C: reserve $r_{i,j}$ for the duration of job j;
        else
            post to C: reserve $r_{i,j}$ for open-ended future for job j;
        end if
    end for
    solve for the undetermined time variables and selection variables in C;
    send commands to modules based on selected capabilities ($b_i$=1) in S and determined time variables in C;
    clean up completed parts of S and C;
    end repeat However, it must be borne in mind that this sequence provides only one possible command set. One skilled in the art would readily appreciate that individual instructions could be varied in form and that the sequence in which steps are performed could vary, all of which embodiments are contemplated by the disclosure and spirit and scope of the claims herein.

This approach of integrated planning and scheduling eliminates the need for a separate, heuristics-based planning algorithm and leads to improved load balancing and productivity over previous approaches. Additionally, the system and method described herein is configuration-independent and thus easily reused for arbitrary reconfigurable production systems that can be modeled in this framework.

While the present invention has been illustrated and described with reference to specific embodiments, further modification and improvements will occur to those skilled in the art. For example, the steps for the planning and scheduling method disclosed herein are not required to be performed in a specified sequence, as will be apparent to one skilled in the art. Indeed, some steps may be executed concurrently with other steps. Also, constraints may be represented numerous different variations. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A computer controlled system for planning and scheduling the work flow, received in the form of work units, for reconfigurable production systems having a plurality of modules with a plurality of alternative capabilities, the system comprising:
    a system controller for integrating resource constraints and time constraints to identify optimal work flow schedules, wherein said controller receives descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;
    at least one planning function, wherein said planning function uses said capability models to determine how to produce the said desired attributes of the work units; and
    at least one scheduling function, wherein said scheduling function utilizes global optimization to schedule selected capabilities and provide a set of scheduled capabilities in the form of commands to the plurality of modules.

2. The system for planning and scheduling reconfigurable production systems according to claim 1, wherein said planning function comprises;
    means for selecting at least one work unit to be planned;
    means for determining capabilities to produce said work unit;
    means for modifying constraints using selection variables;
    means for posting constraints on selection variables and common modules to memory;
    means for posting timing and precedence constraints to memory; and
    means for reserving a selected resource if only part of a job is being scheduled.

3. The system for planning and scheduling reconfigurable production systems according to claim 2, wherein selecting a work unit to be planned is based on an input job description.

4. The system for planning and scheduling reconfigurable production systems according to claim 2, wherein determining capabilities to produce said work unit further comprises considering all reconfigurable production system module capabilities.

5. The system for planning and scheduling reconfigurable production systems according to claim 4, further comprising selecting alternative capabilities from the reconfigurable production system modules.

6. The system for planning and scheduling reconfigurable production systems according to claim 2, wherein said selection variables are created automatically for each capability.

7. The system for planning and scheduling reconfigurable production systems according to claim 2, wherein said selection variables comprise Boolean variables.

8. The system for planning and scheduling reconfigurable production systems according to claim 2, wherein said modified constraints comprise timing constraints.

9. The system for planning and scheduling reconfigurable production systems according to claim 2, wherein said modified constraints comprise the reservation of resources during intervals in which reconfigurable production system modules are occupied.

10. The system for planning and scheduling reconfigurable production systems according to claim 2, wherein posting timing and precedence constraints comprises connecting variables of all alternative capabilities to a single time variable.

11. The system for planning and scheduling reconfigurable production systems according to claim 1, wherein said scheduling function comprises:
    means for selecting capabilities to be scheduled;
    means for reserving exit resources for planned capabilities; and
    means for solving for timing and selection variables.

12. The system for planning and scheduling reconfigurable production systems according to claim 2, further comprising means for acquiring at least one capability model from at least one machine module.

13. The system for planning and scheduling reconfigurable production systems according to claim 1, wherein said machine module comprises a print engine module.

14. The system for planning and scheduling reconfigurable production systems according to claim 1, wherein said machine module comprises and analysis module.

15. The system for planning and scheduling reconfigurable production systems according to claim 1, wherein said machine module comprises a manufacturing fine module.

16. The system for planning and scheduling reconfigurable production systems according to claim 1, wherein said machine module comprises a packaging line module.

17. A method for planning and scheduling the work flow for reconfigurable production systems having a plurality of modules and including a system controller, comprising:
utilizing the system controller to integrate resource constraints and time constraints to identify optimal work flow schedules, wherein said controller receives descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;
planning the work flow for at least one reconfigurable production system, wherein said planning utilizes said capability models to determine how to produce the said desired attributes of the work units; and
scheduling the work flow for the plurality of modules in the reconfigurable production system, wherein said scheduling utilizes global optimization to schedule selected capabilities and provide a set of scheduled capabilities in the form of commands to the plurality of modules.

18. A method for planning and scheduling the work flow for reconfigurable production systems according to claim 17, wherein planning the work flow comprises:
acquiring a description of work units to be produced;
selecting at least one of said work units to be planned;
determining the capabilities needed to produce said work unit;
modifying constraints using selection variables;
posting constraints on selection variables and common modules to memory; and
posting timing and precedence constraints to memory.

19. A method for planning and scheduling reconfigurable production systems having a plurality of modules according to claim 18, wherein determining the capabilities needed to produce said work unit comprises considering all possible reconfigurable production system module capabilities.

20. A method for planning and scheduling reconfigurable production systems having a plurality of modules according to claim 18, wherein determining the capabilities needed to produce said work unit comprises selecting alternative capabilities from the reconfigurable production system modules capabilities.

21. A method for planning and scheduling the work flow for reconfigurable production systems according to claim 18, wherein said modified constraints comprise timing constraints.

22. A method for planning and scheduling the work flow for reconfigurable production systems according to claim 18, wherein said modified constraints comprise the reservation of resources during the intervals in which reconfigurable production system modules are occupied.

23. A method for planning and scheduling the work flow for reconfigurable production systems according to claim 18, wherein said selection variables are created automatically for each capability.

24. A method for planning and scheduling the work flow for reconfigurable production systems according to claim 18, wherein said selection variables comprise Boolean variables.

25. A method for planning and scheduling the work flow for reconfigurable production systems according to claim 18, wherein said precedence constraints comprise connecting the output variables of all alternative capabilities to a single time variable.

26. A method for planning and scheduling the work flow for reconfigurable production systems according to claim 18, further comprising reserving a selected resource if only part of a job is being scheduled.

27. A method for planning and scheduling the work flow for reconfigurable production systems according to claim 17, wherein scheduling the work flow for the plurality of modules in the reconfigurable production system comprises:
selecting capabilities to be scheduled;
reserving exit resources for planned capabilities within the same jobs; and
solving for timing and selection variables of planned capabilities.

28. A method for planning and scheduling the work flow for reconfigurable production systems according to claim 27, wherein said selected capabilities include a subset of capabilities needed to produce said work unit.

29. A method for planning and scheduling the work flow for reconfigurable production systems according to claim 27, wherein said selected capabilities include all of the capabilities needed to produce said work unit.

30. A method for planning and scheduling the work flow for reconfigurable production systems according to claim 18, wherein said capabilities comprise capability models for at least one machine module.

31. A method for planning and scheduling the work flow for reconfigurable production systems according to claim 18, wherein said capabilities comprise feature constraints.

32. A method for planning and scheduling the work flow for reconfigurable production systems according to claim 18, wherein said capabilities comprise timing constraints.

33. An article of manufacture comprising a computer usable medium having computer readable program code embodied in said medium which, when said program code is executed by a computer causes said computer to perform method steps for planning and scheduling reconfigurable systems having a plurality of modules, said method comprising:
utilizing the system controller for integrating resource constraints and time constraints to identify optimal work flow schedules, wherein said controller receives descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;

planning the work flow for at least one reconfigurable production system, wherein said planning utilizes said capability models to determine how to produce the said desired attributes of the work units; and scheduling the work flow for the plurality of modules in the reconfigurable production system, wherein said scheduling utilizes global optimization to schedule selected capabilities and provide a set of scheduled capabilities in the form of commands to the plurality of modules.

34. A method for planning and scheduling the work flow for reconfigurable production systems according to claim 33, wherein planning the work flow comprises:

acquiring a description of work units to be produced;

selecting at least one of said work units to be planned;

determining the capabilities needed to produce said work unit;

modifying constraints using selection variables;

posting constraints on selection variables and common modules to memory; and posting timing and precedence constraints to memory.

35. A method for planning and scheduling the work flow for reconfigurable production systems according to claim 33, wherein scheduling the work flow comprises:

selecting capabilities to be scheduled;

reserving exit resources for planned capabilities within the same jobs; and solving for timing and selection variables of planned capabilities.

* * * * *